US006635688B2

(12) United States Patent
Simpson

(10) Patent No.: US 6,635,688 B2
(45) Date of Patent: Oct. 21, 2003

(54) COMPOSITE POLYURETHANE FOAMS AND METHOD OF MANUFACTURE THEREOF

(75) Inventor: Scott S. Simpson, Woodstock, CT (US)

(73) Assignee: World Properties, Inc., Lincolnwood, IL (US)

( * ) Notice: Subject to any disclaimer, the term of this patent is extended or adjusted under 35 U.S.C. 154(b) by 11 days.

(21) Appl. No.: 09/892,899

(22) Filed: Jun. 27, 2001

(65) Prior Publication Data

US 2002/0028325 A1 Mar. 7, 2002

Related U.S. Application Data

(60) Provisional application No. 60/214,639, filed on Jun. 28, 2000.

(51) Int. Cl.[7] .............................................. C08G 18/06
(52) U.S. Cl. ....................... 521/170; 521/155; 521/174; 428/423.3
(58) Field of Search ................................. 521/155, 170, 521/174; 428/423.3

(56) References Cited

U.S. PATENT DOCUMENTS

| | | | |
|---|---|---|---|
| 2,602,783 A | 7/1952 | Simon et al. | |
| 2,621,166 A | 12/1952 | Schmidt et al. | |
| 2,729,618 A | 1/1956 | Muller et al. | |
| 2,779,680 A | 1/1957 | Reis, Jr. | |
| 2,808,391 A | 10/1957 | Pattison | |
| 2,811,493 A | 10/1957 | Simon et al. | |
| 2,833,730 A | 5/1958 | Barthel, Jr. | |
| 2,834,748 A | 5/1958 | Bailey et al. | |
| 2,846,458 A | 8/1958 | Haluska | |
| 2,866,744 A | 12/1958 | Askey et al. | |
| 2,870,097 A | 1/1959 | Brayton et al. | |
| 2,877,212 A | 3/1959 | Seligman | |
| 2,878,601 A | 3/1959 | Burmeister et al. | |
| 2,901,473 A | 8/1959 | Steinemann | |
| 2,911,390 A | 11/1959 | Smith et al. | |
| 2,917,480 A | 12/1959 | Bailey et al. | |
| 2,962,524 A | 11/1960 | Hastlettler | |
| 3,021,309 A | 2/1962 | Cox et al. | |
| 3,021,310 A | 2/1962 | Cox et al. | |
| 3,021,312 A | 2/1962 | Cox et al. | |
| 3,021,313 A | 2/1962 | Cox et al. | |
| 3,021,314 A | 2/1962 | Cox et al. | |
| 3,021,315 A | 2/1962 | Cox et al. | |
| 3,021,316 A | 2/1962 | Cox et al. | |
| 3,021,317 A | 2/1962 | Cox et al. | |
| 3,057,901 A | 10/1962 | Plueddemann | |
| 3,169,945 A | 2/1965 | Hostettler et al. | |
| 3,201,311 A | 8/1965 | Antonides et al. | |
| 3,383,351 A | 5/1968 | Stamberger | |
| 4,101,704 A | 7/1978 | Hiles ........................... 428/218 |
| 4,346,205 A | 8/1982 | Hiles ........................... 528/53 |
| 5,034,264 A | * 7/1991 | Wagner et al. ........... 428/315.5 |
| 5,420,381 A | 5/1995 | Gardner, Jr. et al. ........ 181/129 |
| 5,580,501 A | 12/1996 | Gallagher et al. ......... 264/45.3 |
| 5,604,267 A | 2/1997 | Duffy .......................... 521/133 |
| 5,733,945 A | 3/1998 | Simpson ...................... 521/124 |
| 5,747,167 A | * 5/1998 | Greene ..................... 264/171.1 |
| 5,859,081 A | 1/1999 | Duffy .......................... 521/133 |
| 5,922,781 A | 7/1999 | St. Clair et al. ............. 521/170 |
| 5,973,016 A | 10/1999 | St. Clair et al. ............. 521/129 |
| 5,989,699 A | 11/1999 | Kuczynski et al. ....... 428/316.6 |
| 6,051,624 A | 4/2000 | Bastin et al. ................ 521/174 |

FOREIGN PATENT DOCUMENTS

GB 733624 7/1955

OTHER PUBLICATIONS

EAR Specialty Composites 1999 Aearo Company Printed 8/99.

* cited by examiner

Primary Examiner—John M. Cooney, Jr.
(74) Attorney, Agent, or Firm—Cantor Colburn LLP

(57) ABSTRACT

Integrally bonded composite polyurethane foams substantially free from coalescence and with no discernable bond or structural interface layer when viewed at 50× magnification can be formed by wet casting a second foamed polyurethane composition onto a first wet cast foamed polyurethane composition and simultaneously curing the cast foams. In a preferred embodiment, one curable polyurethane composition forms a slow recovery foam and the other curable polyurethane composition forms a resilient foam.

14 Claims, 3 Drawing Sheets

COMPOSITE POLYURETHANE FOAMS AND METHOD OF MANUFACTURE THEREOF

CROSS-REFERENCE TO RELATED APPLICATION

This application claims priority to U.S. Application Ser. No. 60/214,639, filed Jun. 28, 2000, which is fully incorporated herein by reference.

FIELD OF THE INVENTION

This invention relates to composite polyurethane foams and methods of manufacture thereof. In particular, this invention relates to a layered polyurethane foamed composite.

BRIEF DESCRIPTION OF THE RELATED ART

Composite, i.e., multiple-layer foamed polyurethane materials are known, and are often manufactured in order to obtain a combination of desirable properties. Such composites have primarily been manufactured by laminating the individual foam layers together, generally by using adhesives. These methods require additional manufacturing steps, and may result in materials with degraded, rather than improved properties.

A composite, dual layer polyurethane foam is disclosed in U.S. Pat. No. 5,859,081 to Duffy, wherein the composite is manufactured by casting an uncured (wet) polyurethane foam composition onto a cured (dry) polyurethane foam. It is admitted in Duffy that the dual layer foam has a "fine and uniform interface between the two layers" (col. 2, lines 59–60). However, such an interface line can interfere with air flow through the multilayer foam structure, reducing the breathability, porosity and water vapor transmission that are important for many applications. In addition, this interface can produce a location for delamination of the layers because it's strength depends on the adhesion of the second cast layer to the first.

It has also been found by the inventors that casting uncured wet polyurethane foam compositions onto a cured (dry) polyurethane open celled foam results in large voids and bubbles in the second layer, due to expansion of the gas in the cells of the first layer during the curing process. In addition to the cosmetic deficiencies of these voids and bubbles the physical properties can also be negatively affected during production and/or use.

Thus, there is a need for a product and a process to make a multilayer foam structure with no structural interface line between the layers.

SUMMARY

A method for the manufacture of multiple layer polyurethane foams, which comprises:
  casting an uncured (wet) polyurethane foam onto a cast, uncured (wet) polyurethane foam; and
  curing the resulting layers of foam such that the final product possesses no discernible structural interface line between the layers when examined at a magnification of 50× using a scanning electron microscope (SEM).

If the different layers have different colors then visible microscopy can be used to visualize the border region between layers. Multilayered foams of the present invention show evidence of polymer diffusion between the layers but the cells of the foam are distributed uniformly from one surface to the other without regard to the transition zone between the layers. Such multilayered foams cannot be delaminated, in that the tear strength of one of the layers is exceeded before any evidence of delamination is seen.

DETAILED DESCRIPTION OF THE PREFERRED EMBODIMENTS

Figure 1:
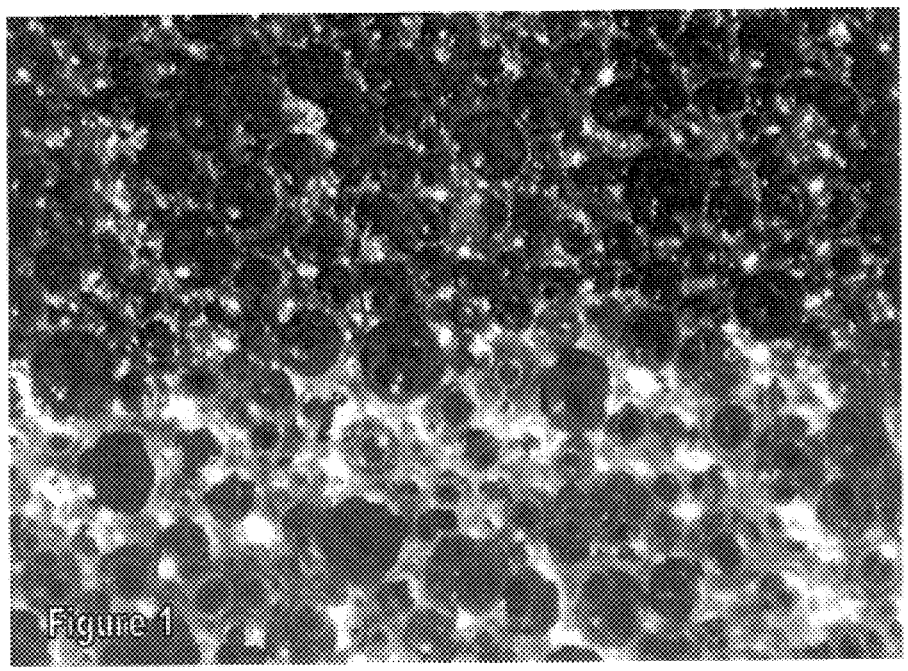
FIG. 1 is a visible light photomicrograph (57×) of a dual layer foam of the present invention in which the layers are different colors.

The composite polyurethane foams described herein comprise at least two foam layers, integrally bonded by wet-on-wet casting of the foam layers as described in detail below. The layers are subsequently cured in position to provide a multi-layered foam. An advantage of this method of polyurethane foam production is that it obviates secondary processing steps such as lamination by heat or the use of adhesives, which are typically required in the manufacturing of multi-layered foams. The lack of adhesive permits airflow between the foam layers, which is an important requirement in many consumer and industrial applications such as footwear insoles where breathability is important. Another significant advantage of this method is the lack of defects such as cell coalescence, which can result in delamination at the interface between the layers. Another advantage is the lack of a detectable structural interface line between the layers, which can interfere with the breathability, porosity, or water vapor transmission. Another advantage to the lack of a detectable structural interface between the layers is that the tear strength of one of the layers is always exceeded before any evidence of delamination is seen.

In general, polyurethane foams are formed from compositions comprising an organic isocyanate component reactive with an active hydrogen-containing component(s), a surfactant, and a catalyst. The process of forming the foam preferably comprises forming the above-described composition; preferably substantially and uniformly dispersing inert gas throughout the mixture by mechanical beating of the mixture to form a heat curable froth, for example, which is substantially structurally and chemically stable, but workable at ambient conditions; and curing to form a cured foam.

In the preparation of a typical multi-layered foam, a first, uncured foam is cast. If required, the thickness is adjusted, for example using a doctor blade. The second, uncured foam is cast onto the first, uncured foam. Again, the second foam is spread to a layer of desired thickness if required. Multiple wet layers may be provided in this manner. The assembly comprising the layers of foam is then cured, for example by heating in an oven to produce a multi-layered, defect free foam. No coalescence of the cells is observed in any of the layers, and at least some cells span the boundary region between the layers (FIGS. 1–4).

In a preferred embodiment, the composition of the layered foam is adjusted such that the top layer is a slow recovery polyurethane foam and the bottom layer is a resilient polyurethane foam. As used herein "slow recovery polyurethane foams" means polyurethane foams having a time to 90% recovery of greater than about 0.25 second after compression to 50% of its original thickness and held for 15 seconds and/or a loss factor of greater than about 0.3 at room temperature as measured by Rheometrics Dynamic Analyzer (hereinafter referred to as RDA). The modulus or stiffness of slow recovery foams typically exhibit significant dependence upon the frequency, or velocity of impact compression. This produces excellent comfort in many applications by providing a very soft feel yet excellent energy absorption during impacts. In contrast to slow recovery polyurethane foams, resilient foams as used herein means foams that recover from compression more quickly. This feature results in these foams providing excellent cushioning by their resilient behavior, which returns most of the energy applied to them rather than absorbing it. As used herein "resilient" polyurethane foams thus means polyurethane foams having a time to 90% recovery of less than about 0.25 second and/or a loss factor (RDA) of less than about 0.3.

The organic polyisocyanate components used in the preparation of polyurethane foams preferably are those having the general formula:

$$Q(NCO)_i$$

wherein i is an integer of two or more and Q is an organic radical having the valence of i, wherein i is greater than 2. Q can be a substituted or unsubstituted hydrocarbon group (i.e., an alkylene or an arylene group). Q can be a group having the formula $Q^1$—Z—$Q^1$ wherein $Q^1$ is an alkylene or arylene group and Z is —O—, —O—$Q^1$S, —CO—, —S—, —S—$Q^1$—S—, —SO—or —$SO_2$—. Examples of such compounds include hexamethylene diisocyanate, 1,8-diisocyanato-p-methane, xylyl diisocyanate, diisocyanatocyclohexane, phenylene diisocyanates, tolylene diisocyanates, including 2,4-tolylene diisocyanate, 2,6-tolylene diisocyanate, and crude tolylene diisocyanate, bis(4-isocyanatophenyl)methane, chlorophenylene diisocyanates, diphenylmethane-4,4'-diisocyanate (also known as 4,4'-diphenyl methane diisocyanate, or MDI) and adducts thereof, naphthalene-1,5-diisocyanate, triphenylmethane-4,4',4"-triisocyanate, isopropylbenzene-alpha-4-diisocyanate, and polymeric isocyanates such as polymethylene polyphenylisocyanate.

Q can also represent a polyurethane radical having a valence of i in which case $Q(NCO)_i$ is a composition conventionally known as a prepolymer. Such prepolymers are formed by reacting a stoichiometric excess of a polyisocyanate as set forth hereinbefore and hereinafter with an active hydrogen-containing component as set forth hereinafter, especially the polyhydroxyl-containing materials or polyols described below. Usually, for example, the polyisocyanate is employed in proportions of from about 30 percent to about 200 percent stoichiometric excess, the stoichiometry being based upon equivalents of isocyanate group per equivalent of hydroxyl in the polyol. The amount of polyisocyanate employed will vary slightly depending upon the nature of the polyurethane being prepared.

The active hydrogen-containing component includes polyhydroxyl-containing compounds, such as hydroxyl-terminated polyhydrocarbons (U.S. Pat. No. 2,877,212); hydroxyl-terminated polyformals (U.S. Pat. No. 2,870,097); fatty acid triglycerides (U.S. Pat. Nos. 2,833,730 and 2,878,601); hydroxyl-terminated polyesters (U.S. Pat. Nos. 2,698,838, 2,921,915, 2,591,884, 2,866,762, 2,850,476, 2,602,783, 2,729,618, 2,779,689, 2,811,493, and 2,621,166); hydroxymethyl-terminated perfluoromethylenes (U.S. Pat. Nos. 2,911,390 and 2,902,473); polyalkylene ether glycols (U.S. Pat. No. 2,808,391; British Pat. No. 733,624); polyalkylene ether glycols (U.S. Pat. No. 2,808,391; British Pat. No. 733,624); polyalkylenearylene ether glycols (U.S. Pat. No. 2,808,391); and polyalkylene ether triols (U.S. Pat. No. 2,866,774).

Especially preferred polyhydroxyl-containing materials are the polyether polyols obtained by the chemical addition of alkylene oxides, such as ethylene oxide, propylene oxide and mixtures thereof, to water or polyhydric organic compounds, such as ethylene glycol, propylene glycol, trimethylene glycol, 1,2-butylene glycol, 1,3-butanediol, 1,4-butanediol, 1,5-pentanediol, 1,2-hexylene glycol, 1,10-decanediol, 1,2-cyclohexanediol, 2-butene-1,4-diol, 3-cyclohexene-1,1-dimethanol, 4-methyl-3-cyclohexene-1,1-dimethanol, 3-methylene-1,5-pentanediol, diethylene glycol, (2-hydroxyethoxy)-1-propanol, 4-(2-hydroxyethoxy)-1-butanol, 5-(2-hydroxypropoxy)-1-pentanol, 1-(2-hydroxymethoxy)-2-hexanol, 1-(2-hydroxypropoxy)-2-octanol, 3-allyloxy-1,5-pentanediol, 2-allyloxymethyl-2-methyl-1,3-propanediol, [4,4-pentyloxy)-methyl]-1,3-propanediol, 3-(o-propenylphenoxy)-1,2-propanediol, 2,2'-diisopropylidenebis(p-phenyleneoxy)diethanol, glycerol, 1,2,6-hexanetriol, 1,1,1-trimethylolethane, 1,1,1-trimethylolpropane, 3-(2-hydroxyethoxy)-1,2-propanediol, 3-(2-hydroxypropoxy)-1,2-propanediol, 2,4-dimethyl-2-(2-hydroxyethoxy)-methylpentanediol-1,5; 1,1,1-tris[2-hydroxyethoxy) methyl]-ethane, 1,1,1-tris[2-hydroxypropoxy)-methyl]propane, diethylene glycol, dipropylene glycol, pentaerythritol, sorbitol, sucrose, lactose, alpha-methylglucoside, alpha-hydroxyalkylglucoside, novolac resins, phosphoric acid, benzenephosphoric acid, polyphosphoric acids such as tripolyphosphoric acid and tetrapolyphosphoric acid, ternary condensation products, and the like. The alkylene oxides employed in producing polyoxyalkylene polyols normally have from 2 to 4 carbon atoms. Propylene oxide and mixtures or propylene oxide with ethylene oxide are preferred. The polyols listed above can be used per se as the active hydrogen compound.

A preferred class of polyether polyols is represented generally by the following formula $$R[(OCH_nH_{2n})_zOH]_a$$

wherein R is hydrogen or a polyvalent hydrocarbon radical; a is an integer (i.e., 1 or 2 to 6 to 8) equal to the valence of R, n in each occurrence is an integer from 2 to 4 inclusive (preferably 3) and z in each occurrence is an integer having a value of from 2 to about 200, preferably from 15 to about 100.

Additional active hydrogen-containing compounds are the polymers of cyclic esters. The preparation of cyclic ester polymers from at least one cyclic ester monomer is well documented in the patent literature as exemplified by U.S. Pat. Nos. 3,021,309 through 3,021,317; 3,169,945; and 2,962,524. Suitable cyclic ester monomers include but are not limited to delta-valerolactone; epsilon-caprolactone; zeta-enantholactone; the monoalkyl-valerolactones, e.g., the monomethyl-, monoethyl-, and monohexyl-valerolactones.

Cyclic ester/alkylene oxide copolymers can also be prepared by reacting a mixture comprising cyclic ester and alkylene oxide monomers, an interfacial agent such as a solid, relatively high molecular weight poly(vinylstearate)

or lauryl methacrylate/vinyl chloride copolymer (reduced viscosity in cyclohexanone at 30° C. from about 0.3 to about 1.0), in the presence of an inert normally-liquid saturated aliphatic hydrocarbon vehicle such as heptane and phosphorus pentafluoride as the catalyst therefor, at an elevated temperature, e.g., about 80° C.

Another type of active hydrogen-containing materials are the polymer polyol compositions obtained by polymerizing ethylenically unsaturated monomers in a polyol as described in U.S. Pat No. 3,383,351, the disclosure of which is incorporated herein by reference. Suitable monomers for producing such compositions include acrylonitrile, vinyl chloride, styrene, butadiene, vinylidene chloride and other ethylenically unsaturated monomers as identified and described in the above-mentioned U.S. patent. Suitable polyols include those listed and described hereinabove and in the U.S. patent. The polymer polyol compositions can contain from 1 to about 70 weight percent (wt %), preferably about 5 to about 50 wt %, and most preferably about 10 to about 40 wt % monomer polymerized in the polyol. Such compositions are conveniently prepared by polymerizing the monomers in the selected polyol at a temperature of about 40° C. to about 150° C. in the presence of a free radical polymerization catalyst such as peroxides, persulfates, percarbonate, perborates and azo compounds.

The exact polyol or polyols employed depends upon the desired characteristics of the polyurethane foam. In particular, variation in the polyol component can yield a wide range of moduli and toughness. The molecular weight and the hydroxyl number of the individual components and the total formulation are selected to result in either slow recovery or resilient flexible foams, such selections being known to those of ordinary skill in the art.

A wide variety of surfactants can be employed for purposes of stabilizing the froth, organosilicone surfactants being preferred. A preferred organosilicone surfactant is a copolymer consisting essentially of $SiO_2$ (silicate) units and $(CH_3)_3SiO_{0.5}$(trimethylsiloxy) units in a molar ratio of silicate to trimethylsiloxy units of about 0.8:1 to about 2.2:1, preferably about 1:1 to about 2.0:1. Another preferred organosilicone surfactant stabilizer is a partially cross-linked siloxane-polyoxyalkylene block copolymer and mixtures thereof wherein the siloxane blocks and polyoxyalkylene blocks are linked by silicon to carbon, or by silicon to oxygen to carbon, linkages. The siloxane blocks are comprised of hydrocarbon-siloxane groups and have an average of at least two valences of silicon per block combined in said linkages. At least a portion of the polyoxyalkylene blocks are comprised of oxyalkylene groups and are polyvalent, i.e., have at least two valences of carbon and/or carbon-bonded oxygen per block combined in said linkages. Any remaining polyoxyalkylene blocks are comprised of oxyalkylene groups and are monovalent, i.e., have only one valence of carbon or carbon-bonded oxygen per block combined in said linkages. Additionally, conventional organopolysiloxane-polyoxyalkylene block copolymers such as those described in U.S. Pat. Nos. 2,834,748, 2,846,458, 2,868,824, 2,917,480 and 3,057,901 can be employed. The amount of the organosilicone polymer employed as a foam stabilizer in this invention can vary over wide limits, e.g., from about 0.5 weight parts to 10 weight parts or greater, per hundred weight parts of the active hydrogen component. Preferably, the amount of organosilicone copolymer present in the foam formulations varies from about 1.0 weight parts to about 6.0 parts on the same basis.

Catalysts include various inorganic metal compounds and metal compounds that include certain organic groups. Metal acetyl acetonates are preferred, based on metals such as aluminum, barium, cadmium, calcium, cerium (III), chromium (III), cobalt (II), cobalt (III), copper (II), indium, iron (II), lanthanum, lead (II), manganese (II), manganese (III), neodymium, nickel (II), palladium (II), potassium, samarium, sodium, terbium, titanium, vanadium, yttrium, zinc and zirconium. A common catalyst is bis(2,4-pentanedionate) nickel (II) (also known as nickel acetylacetonate or diacetylacetonate nickel) and derivatives thereof such as diacetonitrilediacetylacetonato nickel, diphenylnitrilediacetylacetonato nickel, bis(triphenylphosphine) diacetyl acetylacetonato nickel, and the like. Ferric acetylacetonate is particularly preferred, due to its relative stability, good catalytic activity and lack of toxicity. The metal acetylacetonate is most conveniently added by pre-dissolution in a suitable solvent such as dipropylene glycol or other hydroxyl containing compound which will then participate in the reaction and become part of the final product.

Added to the metal acetyl acetonate is acetyl acetone (2,4-pentanedione), as disclosed in commonly assigned U.S. Pat. No. 5,733,945 to Simpson, which is incorporated herein by reference. The acetyl acetone provides heat latency, which allows time for the required mixing, casting and other procedures, and avoids deleterious premature curing during low temperature processing. However, as the material is cured in the several heating zones and the temperature of the urethane mixture rises, the acetyl acetone is driven off. With the acetyl acetone removed together with its associated delaying function, the metal acetyl acetonate is allowed to resume its normally high reactivity and provide a very high level of catalysis at the end of the polyurethane reaction. This high reactivity late in the processing cycle is advantageous and provides improved physical properties such as compression set. In general, the ratio of metal acetyl acetonate to acetyl acetone is about 2:1 on a weight basis. The amount of catalyst present in the liquid phase is preferably in the range of 0.03 to 3.0 weight parts per hundred weight parts of the active hydrogen compound.

Other, optional additives may be added to the polyurethane froth mixture in the manufacturing process. For example, conventionally used additives such as fillers (alumina trihydrate, silica, talc, calcium carbonate, clay, and the like), dyes, pigments (for example titanium dioxide and iron oxide) and the like can be used. Use of hindered amine light stabilizers further imparts UV resistance. Small amounts of an auxiliary blowing agent can be employed. For example, high boiling fluorocarbons, e.g., boiling above about 40° C. can be used. Specific fluorocarbons include for example 1,1,2-trichloro-1,2,2-trifluoroethane and isomers of tetrachlorodifluoroethane, tetrachloromonofluoroethane, and the like. Other auxiliary blowing agents, such as small amounts of water, although it is not necessary, can be employed for purposes of providing an added expansion during heat curing in those cases where such added expansion is desired.

Slow recovery polyurethane foams suitable for use in the composites are known in the art, being described for example, in U.S. Pat. Nos. 6,051,624; 5,420,381 to Gardner and Simon; U.S. Pat. No. 4,346,205; and U.S. Pat. No. 4,101,704.

Resilient polyurethane foams are also formed from compositions comprising an organic isocyanate component reactive with an active hydrogen-containing component, a surfactant, and a catalyst as defined above. Methods and formulations for the formation of resilient polyurethane foams are disclosed, for example, in U.S. Pat. No. 5,973,016 and U.S. Pat. No. 5,922,781.

Either or both of the slow recovery and resilient foams may be foamed using chemical blowing agents, but are preferably manufactured by mechanical frothing with an inert gas. The gas phase of the froths is most preferably air because of its cheapness and ready availability. However, if desired, other gases can be used which are gaseous at ambient conditions and which are substantially inert or non-reactive with any component of the liquid phase. Such other gases include, for example, nitrogen, carbon dioxide and fluorocarbons that are normally gaseous at ambient temperatures. The inert gas is incorporated into the liquid phase by mechanical beating of the liquid phase in high shear equipment such as in a Hobart mixer or an Oakes mixer. The gas can be introduced under pressure as in the usual operation of an Oakes mixer or it can be drawn in from the overlying atmosphere by the beating or whipping action as in a Hobart mixer. The mechanical beating operation preferably is conducted at pressures not greater than 100 to 200 p.s.i.g. Conventional, readily available, mixing equipment can be used and no special equipment is necessary. The amount of inert gas beaten into the liquid phase is controlled by gas flow metering equipment to produce froth of the desired density. The mechanical beating is conducted over a period of a few seconds in an Oakes mixer, or of 3 to 30 minutes in a Hobart mixer, or however long it takes to obtain the desired froth density in the mixing equipment employed. The froth as it emerges from the mechanical beating operation is substantially chemically stable and is structurally stable but easily workable at ambient temperatures, e.g., about 10° C. to about 40° C.

After frothing, the first (bottom) froth mixture is transferred at a controlled rate through a hose or other conduit to be deposited onto a moving release support. The release support will usually be a release paper that may either have a plain surface or a textured surface onto which the foam mixture is deposited. The release paper is played out from a supply roll and is pulled by rolls to pass by various stations in the system, and, generally, is ultimately rewound on a take-up roll. In addition to paper, the support material may be a thin sheet of metal such as stainless steel or be made from a polymer film such as PET or of many types of composite materials; it may have a release coating or be coated with a material such as a urethane film that transfers to the surface of the foam. If desired, the support material may be a substrate of fibrous or other material that becomes laminated to and forms part of the final product instead of being separated from the foam and being rewound on a take-up roll. Alternatively, the release support could also be a conveyor belt.

As the release paper or other substrate is moved with the foam material deposited thereon, the foam is spread to a layer of desired thickness by a doctoring blade or other suitable spreading device. A simple knife-over-table doctoring blade or other more complex spreading devices such as a knife-over-roller coaters or three- or four-roll reversible coaters may be employed. The doctoring blade spreads the foam material to the desired thickness, which will typically be in the range of from 0.01 to 0.250 inches.

After the first froth is spread, the second (top) froth is transferred at a controlled rate through a hose or other conduit to be deposited onto the first, uncured froth. Again, as the release paper or other substrate is moved with the two layers of the foam material deposited thereon, the top foam is spread to a layer of desired thickness by a doctoring blade or other suitable spreading device. The doctoring blade spreads the foam material to the desired thickness, which will typically be in the range of from 0.01 to 1.00 inches.

More than two layers may be assembled in this fashion. It should be noted that the order of casting, i.e., which layer is cast first, and thus the "bottom" layer in the production of the composite foam, may or may not be the "bottom layer" in the use of the product. In some cases it is advantageous for production to have one of the layers cast first. This does not limit the use of the product to that orientation. In fact, frequently the layer cast first is placed on the top when in use.

The assembly of the release support and the multiple, gauged layers of foam is then delivered to a heating zone for cure of the polyurethane foams, wherein the temperatures are maintained in a range from about 90° C. to about 220° C. depending on the composition of the foam material. Differential temperatures can be established for purposes of forming an integral skin on an outside surface of the foam or for adding a relatively heavy layer to the composite foam.

After the material is heated and cured, it is then passed to a cooling zone where it is cooled by any suitable cooling device such as fans. The final step of the process involves the removal of the release paper and taking it up on a roll. The removal of the release paper leaves as a final product the cured, composite polyurethane foam. This final product is then taken up on a roll for storage and use as desired. The polyurethane foam product produced by the process described will be a composite foam sheet of uniform gauge.

The gauge of the mechanically frothed embodiment of this invention easily controlled by the doctoring blade since there is no reactive expansion of foaming material during the curing process. The only expansion during the curing process is the heat induced expansion of the gas contained in the cells in the foam mixture, the total amount of which can be easily calculated in advance to provide close control of the gauge of the finished product. The density of the finished product is also relatively uniform because the conduction and radiant heating during the curing process provides for relatively even heat distribution across the foam sheet, at least for sheets up to 0.50 inches thick.

Figure 5:
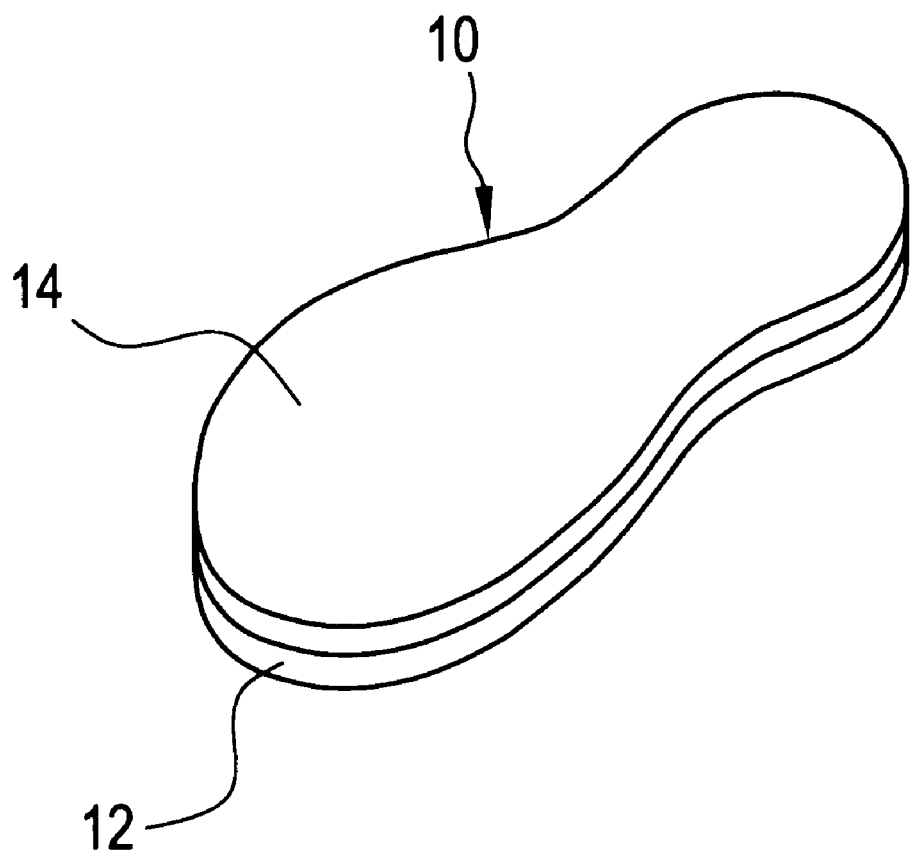
FIG. 5 is a schematic diagram of a multi-layer shoe sole insert made from the dual layer foam.

The composite foams find particular utility as shoe soles, for example as shown in FIG. 5, wherein shoe sole 10 comprises an in-use bottom layer 12 of a resilient foam and an in-use top layer 14 of a slow recovery foam.

It has been found that it is important that the cure rate profiles of the layers to be cast should be matched. By using the same catalyst system for each layer the cure profiles are close enough to each other that no problems have been encountered. It has also been found that, for some systems the bottom layer could only be successfully cast up to about 188 mils thick. Above this thickness the material can still be easily produced but the uniformity of the thickness of the bottom layer is sacrificed. The spreading of the second layer to thickness tends to push the first layer outwards, creating a thin spot in the center of the sheet. This problem could be avoided by using better or different spreading techniques, adjusting for the effect by casting the first layer thicker in the center and/or increasing the viscosity of the first layer to prevent this spreading.

The invention is further illustrated by the following non-limiting examples.

EXAMPLES

For each foam, all components (polyol, catalyst and additives except for surfactant and pigment) except for the isocyanate were mixed and placed in a holding tank with agitation and under dry nitrogen. This mixture was then pumped at a controlled flow rate to a high shear mixing head of the Oakes type. The isocyanate mixture, surfactant and pigment mixture were also separately pumped into the mixing head at controlled flow rates and at the proper flow ratios relative to the polyols mixture flow rate. Flow meters were used to measure and adjust the flow rates of the various raw material streams. Dry air was introduced into the mix head using a gas flow rate controller to adjust the airflow rate such that cured material had a density of about 20 pounds per cubic foot (PCF) for the resilient foam layer which was cast first and, using a separate mixture, holding tank, pumping and metering equipment a second slow recovery foam layer was produced with an air flow rate adjusted to produce a cured foam of about 15 PCF.

After mixing and foaming in the high shear mixer, the materials were pumped through flexible hoses and out through rigid nozzles. The resilient foam was then cast onto coated release paper that had been dried by passing it through an infrared drier just prior to the point where the foam was introduced. This prevented any water that might have been in the paper from participating in the reaction. The release paper was about 65 inches wide and was drawn through the machine at a controlled speed, in this case at about 40 feet per minute (FPM). The paper and cast foam then passed under a knife over plate (KOP) coater. The KOP spread the foam and was used to control the thickness of the final product to about 0.098 inches. The cast width of the first slow recovery foam layer was about 60 inches.

The second slow recovery foam layer was then cast on the first layer and spread to a thickness of about 0.098 inches for a total foam thickness of about 0.196 inches. The coated release paper then passed through a curing section consisting of heated platens kept at 120° C. to 190° C. by a series of thermocouples, controllers and heating elements. A series of upper platens were kept at 220° C. The cured product then passed through an air-cooling section, a series of drive rollers and was wound up on a take-up roll.

The loss factor of the composite foam was measured using a Rheometrics RDAII Dynamic Analyzer, Model RW 35076, using the Dynamic Temperature Ramp at a frequency of 100 radians per second at 0.3% strain. The test specimen consisted of a one-inch circle die-punched from a sheet of material. The sample was placed between one inch serrated parallel plates and compressed slightly. The gap dimension was recorded at 20% normal force as displayed by the instrument and maintained using the instrument's auto-tension feature. Test temperatures ranged from −40° C. to 210° C. using a 5° C. per minute temperature ramp. A typical loss factor for the composite foam was about 0.3 while for the resilient foam was less that about 0.2 at or near room temperature and for slow recovery foams was greater than 0.8.

The following Table shows examples of production and pilot scale materials successfully produced as two layer foams, wherein density is in pounds per cubic foot and thickness is in mils. Formulations A, B, C, E, and F are catalyzed by a ferric/acetylacetonate system, whereas formulations D and G are catalyzed by a different system.

| Layer A Formulation | Density | Thickness | Layer B Formulation | Density | Thickness |
|---|---|---|---|---|---|
| Production Scale | | | | | |
| A | 25 | 10 | on B | 25 | 10 |
| A | 25 | 17 | on B | 25 | 17 |
| A | 25 | 17 | on B | 25 | 30 |

-continued

| Layer A Formulation | Density | Thickness | Layer B Formulation | Density | Thickness |
|---|---|---|---|---|---|
| A | 25 | 35 | on B | 25 | 35 |
| A | 12 | 85 | on E | 15 | 85 |
| B | 15 | 62 | on E | 15 | 150 |
| A | 20 | 125 | on E | 15 | 125 |
| B | 15 | 150 | on E | 15 | 150 |
| B | 15 | 230 | on E | 15 | 150 |
| B | 20 | 150 | on E | 15 | 150 |
| A | 20 | 250 | on E | 15 | 125 |
| *C | 15 | 98 | on E | 20 | 98 |
| Pilot Scale | | | | | |
| **B | 30 | 20 | on F | 25 | 40 |
| D | 20 | 80 | G | 20 | 40 |

Figure 2:
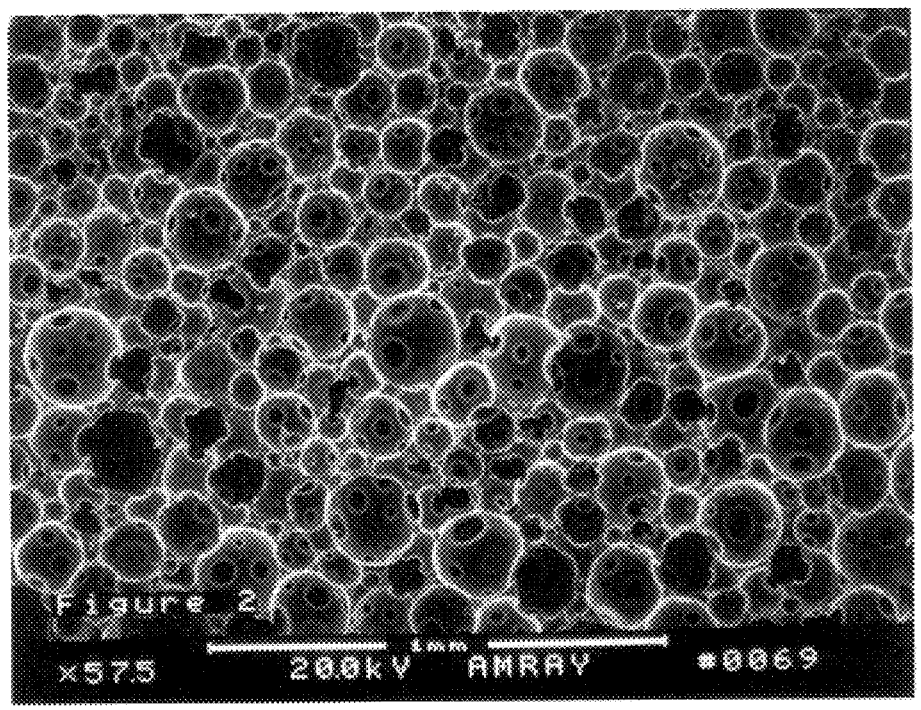
FIG. 2 is a scanning electron photomicrograph (57×) of the same region of the same sample shown in FIG. 2.
Figure 3:
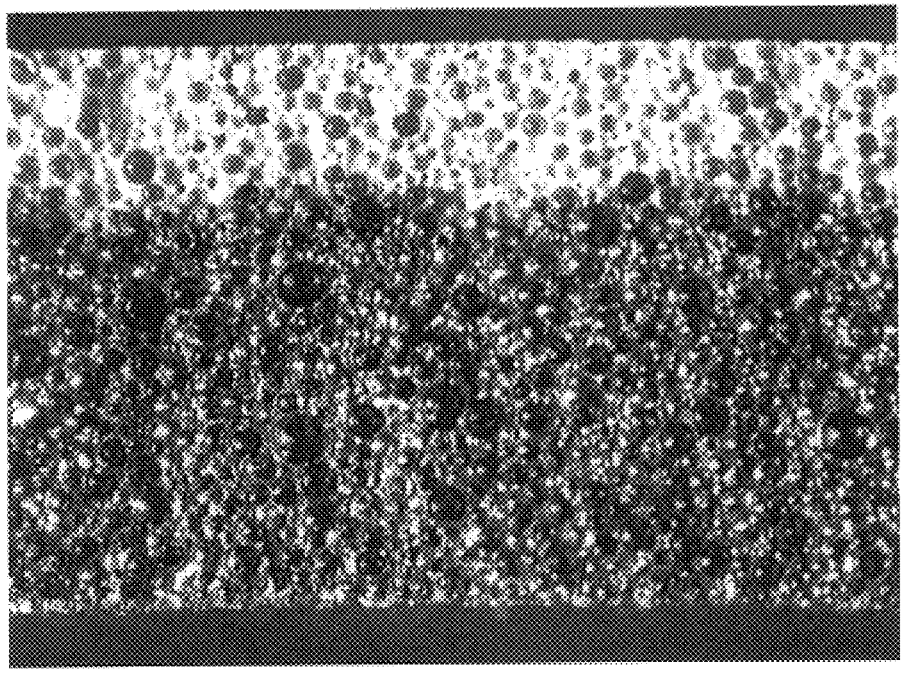
FIG. 3 is a visible light photomicrograph (57×) of a dual layer foam of the present invention in which the layers are different colors, and in which the average cell diameter of one layer is apparently different than the average cell diameter of the other layer.
Figure 4:
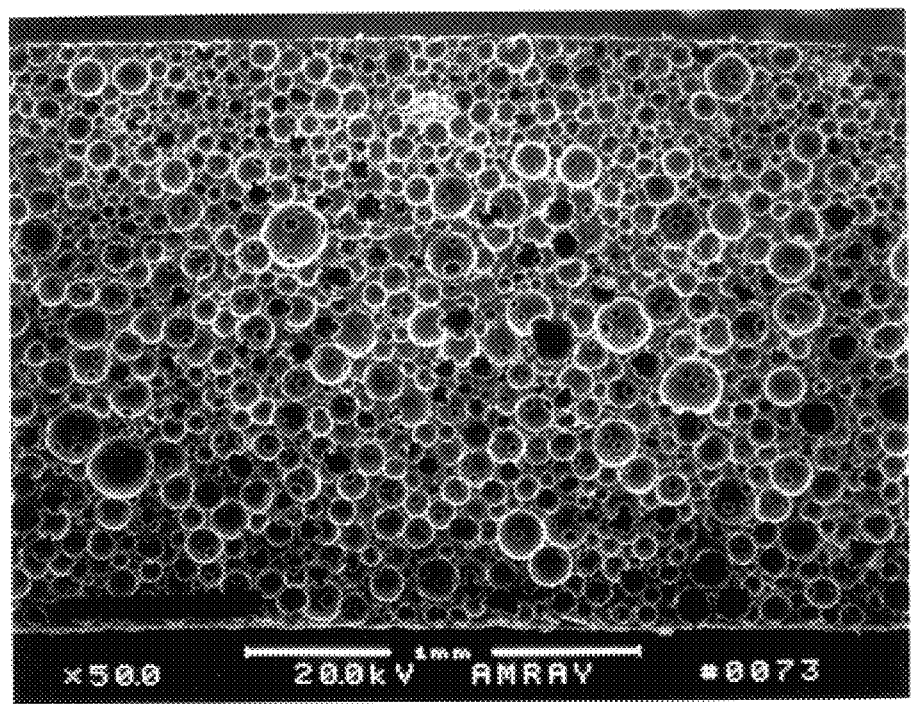
FIG. 4 is a scanning electron photomicrograph (50×) of the transition zone of the same sample shown in FIG. 2.

*Composite foam shown in FIGS. 1 and 2
**Composite foam shown in FIGS. 3 and 4.

This table demonstrates the wide range of thickness and density combinations that can be produced according to this invention. As shown in FIG. 1, when the first and second layer are different colors, the transition zone between the foams may be detected, including where a small degree of diffusional mixing between the foams has occurred. FIG. 1 further shows that at least some cells span the boundary region between the two layers. When precisely the same region of the same foam is viewed by scanning electron microscopy, however, there is no discernible structural interface line between the layers (FIG. 2).

This same trend is seen in FIGS. 3 and 4, where two foams of different colors and different apparent average cell sizes were cast. The transition zone is observable in FIG. 3 by virtue of the different colors, but there is no discernible structural interface line in the SEM of the same foam shown in FIG. 4. At least some of the cells may be observed to span the boundary region between the two foams.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for the manufacture of multiple layer polyurethane foams, which comprises:
    casting a first, foamed mixture comprising an organic isocyanate component, an active hydrogen-containing component reactive with the isocyanate component, a surfactant, and a catalyst onto a second, foamed mixture comprising an organic isocyanate component, an active hydrogen-containing component reactive with the isocyanate component, a surfactant, and a catalyst; and
    curing the resulting multiple layers to form a multiple layer, polyurethane foam having no discernible structural interface line between the layers when viewed at 50× magnification by SEM.

2. A method of claim 1, wherein the first and second mixture each have a different composition.

3. The method of claim 1, wherein one of the curable polyurethane composition forms a resilient foam; and the other of the curable polyurethane composition forms a slow recovery foam.

4. The method of claim 1, further comprising casting a third foamed mixture comprising an organic isocyanate component, an active hydrogen-containing component reactive with the isocyanate component, a surfactant, and a catalyst onto the second layer prior to cure.

5. A multiple layer, polyurethane foam, comprising a first polyurethane foam layer; and a second polyurethane foam layer, wherein there is no discernible structural interface line between the layers when viewed at 50× magnification by SEM.

6. The multiple layer, polyurethane foam of claim 5, wherein the first and second layers each have a different composition.

7. The multiple layer, polyurethane foam of claim 5, wherein one of the layers is a resilient foam; and the other of the layers is a slow recovery foam.

8. The multiple layer, polyurethane foam of claim 5, further comprising a third polyurethane foam layer, wherein there is no discernible structural interface line between the third layer and the layer on which it is disposed when viewed at 50× magnification by SEM.

9. A multiple layer, polyurethane foam, comprising a first polyurethane foam layer; and a second polyurethane foam layer disposed on the first layer, wherein one or more cells span the boundary region between the layers wherein there is no discernible structural interface line between the layers when viewed at 50× magnification by SEM.

10. The multiple layer, polyurethane foam of claim 8, wherein the first and second layers each have a different composition.

11. The multiple layer, polyurethane foam of claim 8, wherein one of the layers is a resilient foam; and the other of the layers is a slow recovery foam.

12. The multiple layer, polyurethane foam of claim 8, further comprising a third polyurethane foam layer disposed on the first or second layers, wherein one or more cells span the boundary region between the layers.

13. An article comprising the foam of any one of claims 4–12.

14. A shoe insert comprising any one of the multiple layer foams of claims 4–12.

* * * * *